United States Patent
Capel et al.

(10) Patent No.: US 10,740,789 B2
(45) Date of Patent: Aug. 11, 2020

(54) MODIFYING ADVERTISEMENT BIDS USING PREDICTED ADVERTISEMENT PERFORMANCE

(71) Applicant: Facebook, Inc., Menlo Park, CA (US)

(72) Inventors: David Paul Capel, Belmont, CA (US); Harsh Doshi, San Francsico, CA (US); Benjamin Casey Roberts, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 878 days.

(21) Appl. No.: 14/965,497

(22) Filed: Dec. 10, 2015

(65) Prior Publication Data

US 2017/0169465 A1   Jun. 15, 2017

(51) Int. Cl.
*G06Q 30/02* (2012.01)

(52) U.S. Cl.
CPC ..... *G06Q 30/0249* (2013.01); *G06Q 30/0275* (2013.01); *G06Q 30/0277* (2013.01)

(58) Field of Classification Search
CPC .................................................. G06Q 30/02
See application file for complete search history.

(56) References Cited

U.S. PATENT DOCUMENTS

| 2003/0149622 | A1* | 8/2003 | Singh | G06Q 30/0247 705/14.48 |
| 2011/0071900 | A1* | 3/2011 | Kamath | G06Q 30/0275 705/14.46 |
| 2012/0253948 | A1* | 10/2012 | O'Bryan | G06Q 30/0251 705/14.71 |
| 2015/0134462 | A1* | 5/2015 | Jalali | G06Q 30/0275 705/14.71 |
| 2015/0269609 | A1* | 9/2015 | Mehanian | G06Q 30/0246 705/14.45 |
| 2016/0098735 | A1* | 4/2016 | Sinha | G06Q 30/0241 705/7.31 |
| 2016/0162955 | A1* | 6/2016 | O'Kelley | G06Q 30/0275 705/14.71 |
| 2016/0210656 | A1* | 7/2016 | Chittilappilly | G06Q 30/0246 |
| 2016/0292722 | A1* | 10/2016 | Myers | G06Q 30/0247 |

OTHER PUBLICATIONS

Wiley Encyclopedia of Computer Science and Engineering (Year: 2009).*

* cited by examiner

*Primary Examiner* — Arthur Duran
*Assistant Examiner* — Breffni Baggot
(74) *Attorney, Agent, or Firm* — Baker & Hostetler LLP

(57) ABSTRACT

An advertising system provides advertisements to client devices. To select advertisements, the advertising system identifies previously selected advertisements to determine which presentations of the advertisement are still in-flight and have not yet resulted in conversion event. The advertising system predicts total advertising spend based on the in-flight advertisements, and adjusts a paced bid for the advertisement by determining whether the estimated total advertising spend, reflecting predicted in-flight advertisements, is above or below an expected spending to reach a budget for the advertising campaign, which may increase or decrease the paced bid.

17 Claims, 6 Drawing Sheets

MODIFYING ADVERTISEMENT BIDS USING PREDICTED ADVERTISEMENT PERFORMANCE

BACKGROUND

This disclosure generally relates to advertising campaigns, and more specifically to pacing bids for advertisements on an online system.

Advertising systems may present advertisements to users of various computing devices to provide revenue to providers of content and other services to the computing devices. These advertisements are typically selected from advertising campaigns run by various advertisers via an auction. Advertisers may have certain goals when planning a new advertising campaign ("ad campaign"). For example, an advertiser may have a goal for the number of times an advertisement is presented to clients of an online system (i.e., the number of "impressions" of the advertisement), user interactions with an advertisement, user interactions with a third party site or product advertised by the advertisement, or other actions by the user that may be caused by viewing the advertisement. Payment to the advertising system for placement of an advertisement may be contingent on meeting one of these goals. The goals on which payment is based are termed "conversion events." In addition, an advertiser may specify certain constraints, or attributes, of an advertising campaign such as targeting characteristics for a target audience of the advertisement, or a budget for the advertising campaign.

An advertiser bids in the auction using a bid amount associated with advertisements in the advertising campaign. As an advertising campaign proceeds, the bid amount used in the auction for that ad may be adjusted and the ad campaign may end when the campaign reaches its budget. The bid amount used in the auction is termed a paced bid, and may be adjusted to pace selection of the advertisement according to the budget and time for an advertising campaign to run. An advertiser may specify a compensation amount that the advertiser will provide to an online system when the conversion event occurs resulting from the advertisement. However, advertisements must be selected for a user in advance of the conversion event's occurrence due to electronic delays, failure of a system to actually retrieve the advertisement, verification of the conversion event, or the delay of a user performing the conversion event after viewing the advertisement. As a result, an advertising system may continue receiving notification of conversion events after a budget has been reached. In this example, the advertiser's budget is exceeded. Alternatively, the online system may stop presenting an advertiser's ad prematurely by mistakenly expecting that additional conversion events will occur thereby resulting in a situation in which the advertiser's budget is not spent before the campaign ends. Thus, this delay between advertising selection and identification of conversion events may result in "jerky" pacing of an advertiser's bid in an auction as the pacing overs or under-adjusts. This may cause over or underspending of the advertiser's planned budget thus resulting in inefficient use of an advertiser's budget for presenting advertisements in an advertising campaign. In some examples, the advertising system loses revenue or must 'write off' revenue for related to conversion events achieved after the budget is reached.

SUMMARY

An advertising system receives an advertising campaign from an advertiser. The advertising campaign specifies a budget amount and a target audience for one or more advertisements for presentation to users referred to the advertising system. The advertising system selects an advertisement for these users, who may come from a variety of different systems, including for example users of a social networking system. The budget amount specifies the total compensation that the advertiser is willing to pay to the advertising system to place advertisements and reach the target audience for the duration of the ad campaign. This compensation may be paid as conversion events occur related to the advertisements.

Based on the specified advertisement budget including the remaining length (in time) associated with a particular ad campaign, the advertising system may determine a paced bid amount for individual campaigns to compete in an ad auction. The paced bid is determined based on the conversion events for an advertisement (which already caused spending) and accounts for advertisements that have been selected for users, but for which no conversion event has occurred yet. The selection of an advertisement is accounted for by determining a likelihood (e.g., probability) of conversion calculated based on prior historical data. The likelihood of conversion may be based on the amount of time elapsed between selection of the advertisement, the conversion event, and characteristics of the user. For example, the likelihood of a conversion may follow a decreasing exponential trend over time.

When the advertising system identifies opportunities to present advertisements to clients, one or more advertisements from one or more ad campaigns are included in the auction. The auction uses the paced bid associated with selected one or more advertisements. The advertisement selected from the auction is sent for presentation to a user and the selection of that advertisement is used to pace the bid for the selected advertisement, prior to any conversion event for that advertisement. The advertisements selected but not yet converted are termed "in-flight" advertisements.

Depending on the number of conversion events recorded and the advertisements that have been selected but not yet converted, the paced bid for the advertisement is modified. For example, the paced bid amount is increased if the spending from conversion events and spending expected from in-flight events relative to an expected spending for the budget is low. The paced bid amount is then associated with advertisements from the advertising campaign in subsequent auctions. The paced bid amount determined may be based on the probability of a conversion event and the time remaining in the ad campaign for the in-flight advertisements. This allows the paced bid amount associated with advertisements in the advertising campaign to be modified based on the results of selection process (i.e., auction results), prior to the occurrence of the conversion events, which permits the advertisements to more closely reach the budget without over or underspending.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
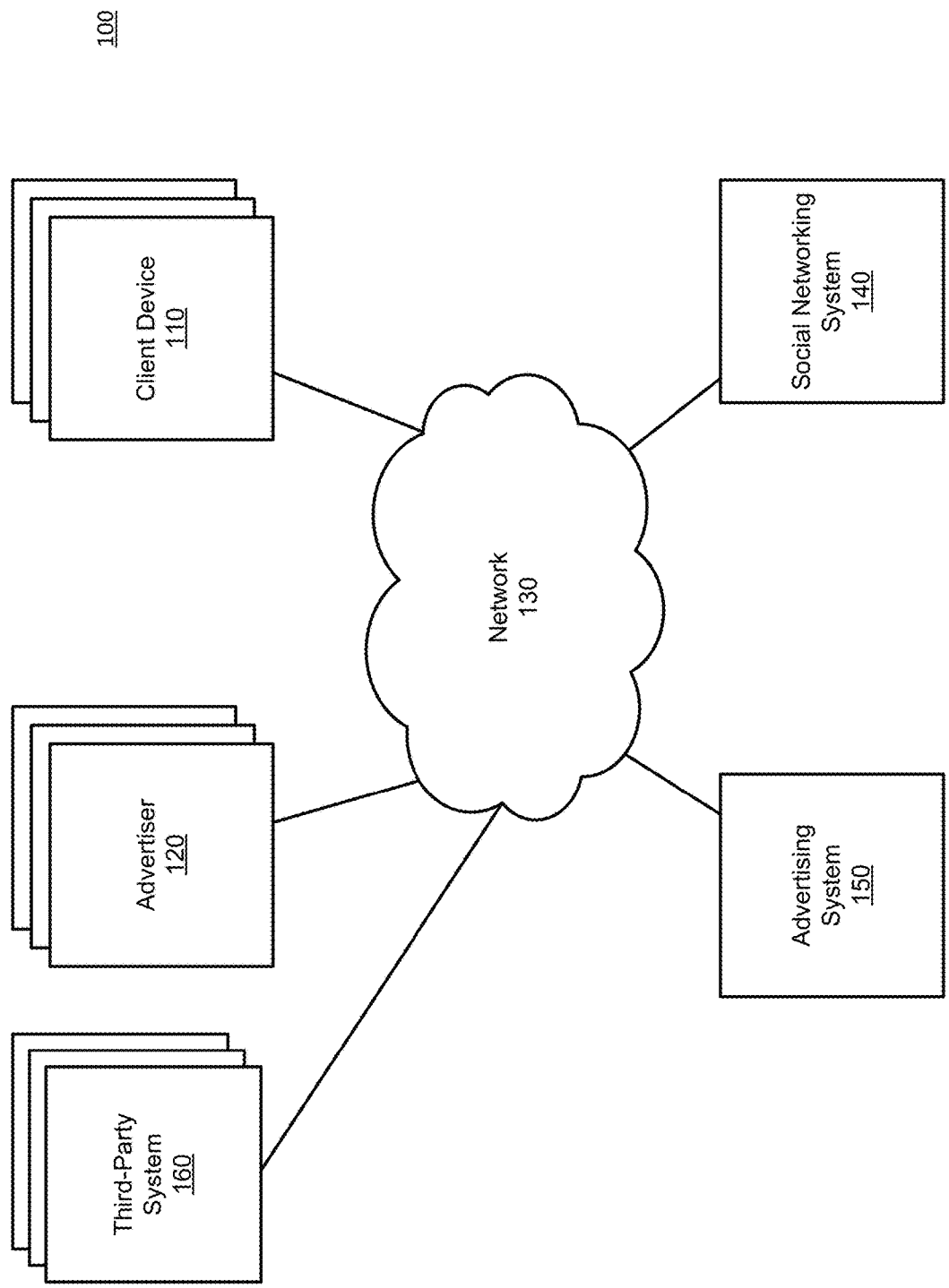
FIG. 1 is a block diagram of a system environment for an advertising system, in accordance with an embodiment.

FIG. 1 is a block diagram of a system environment 100 for an advertising system 150, in accordance with one embodiment. The system environment 100 shown by FIG. 1 includes one or more client devices 110, one or more advertisers 120, a network 130, a social networking system 140 and an advertising system 150. In alternative configurations, different and/or additional components may be included in the system environment 100.

The client devices 110 access the advertising system 150 to receive advertisements for display to a user of the client device 110. Advertisers 120 provide advertisements in an advertising campaign to the advertising system 150. The advertising system selects advertisements for each advertising request from a client device 110. Each advertisement is associated with one or more conversion events, for which the advertising system may be paid for placement of the advertisement. Some conversion events include a user's interaction with third-party systems associated with an advertiser, such as a third-party system identified in an advertisement. The advertising system 150 may communicate with the social networking system 140 to identify characteristics of the user, and actions on the social networking system by the user may be the conversion event for an advertisement. The advertising system 150 sets a paced bid for an advertisement based on already-selected placements of that advertisement that have not yet generated a conversion event. To set this paced bid, the advertising system 150 predicts the likelihood that the conversion event will occur.

The client devices 110 are one or more computing devices capable of receiving client input as well as transmitting and/or receiving data via the network 130. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is communicates via the network 130. In one embodiment, a client device 110 executes an application allowing a user of the client device 110 to interact with the social networking system 140. For example, a client device 110 executes a browser application to enable interaction between the client device 110 and the social networking system 140 via the network 130. In another embodiment, a client device 110 interacts with the social networking system 140 through an application programming interface (API) running on a native operating system of the client device 110, such as IOS® or ANDROID™.

Each of the advertisers 120 is associated with one or more third-party systems 160 and provides advertisements and parameters for the advertisement (such as ad budgets, other constraints, and goals) to the advertising system 150. The client devices 110 request an ad from the advertising system 150. The advertising system 150 conducts an auction among stored ads and selects an ad based on the auction in response to receiving an ad request from a client 110. Although three client devices 110 and three advertisers 120 are shown in FIG. 1, any number of client devices 110 or advertisers 120 may communicate with the social networking system 140, the third-party systems 160 and the advertising system 150. The advertising system 150 may be a separate system as shown here, or implemented by one or more advertisers 120, or by the social networking system 140. The advertising system is further described below in conjunction with FIG. 2.

The client devices 110 and advertisers 120 communicate via the network 130. As used herein, "client" refers to any entity which requests an ad from the advertising system 150, and "advertiser" refers to an entity which provides an ad to the advertising system 150 for subsequent selection and display to a user of the client.

The network 130 may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

A client device 110 may request an ad from the advertising system 150 directly. For example, a client device 110 may access a webpage, and the webpage may client the client device 110 to request an ad from the advertising system 150 to display on the website to the user. Alternatively, the client device 110 may request an ad indirectly, by accessing or using a system that in turn requests an ad from the advertising system 150. For example, the client device 110 may access a website and an ad may be requested by the website from the advertising system 150 for placement in the website. Alternatively, client device 110 may be a software application or a game, and the application or game may request an ad from the advertising system 150 for display to a user of the application or game. For example, a user may play a game, and the game may request an ad from the advertising system 150 to display the ad in the game to the user. In one embodiment, the social networking system 140 is the client device 110, and the social networking system 140 requests an ad from the advertising system 150 to display to a user in a social networking system page.

The ads may be interacted with in a variety of ways. As described further below, these various interactions may be considered a conversion event by the advertising system 150, and may be the event that causes an advertiser to pay for the display of the ad to the user. One example interaction is the display of the advertisement to the user (i.e., an impression of the advertisement). As additional examples, a user may click on or otherwise select the ad, and the ad may direct the client device 110 to a page associated with the ad. Once on the page associated with the ad, the user may take additional actions, such as purchasing a product or service associated with the ad, receiving information associated with the ad, and subscribing to a newsletter associated with the ad or viewing an audiovisual stream. In some embodiments, ads may include games, which a user may play within the context of the ad. An ad may also allow a user to answer a poll or question posed within the ad.

In one or more embodiments, ads may contain social networking system functionality with which a user may interact. For instance, ads may allow a user to "like" or otherwise endorse the ad by selecting a button or link associated with endorsement. Likewise, a user may share the ad another social networking system user, or may interact with an event associated with an event advertised in the ad. In addition, an ad may contain social networking system context directed to the user. For example, an ad may display information about a friend of the user within the social networking system 140 who has taken an action associated with the subject matter of the ad. When a user interacts with the advertisement, the client device 110, third-party system 160, and social networking system 140 notify the advertising system 150 of the interaction, and may include an identification of the user or the advertisement viewed by the user.

The advertising system 150 conducts an ad selection among stored ad campaigns. As described above, the selected ad may be provided directly or indirectly to the client device 110 for display to a user. The advertising system 150 also includes an interface for receiving ads from one or more advertisers 120 and providing settings for the ad campaigns. The advertising system 150 is further described, below, in conjunction with FIG. 2.

A third party system 160 may also communicate information to the advertising system 150, such as advertisements, content, billing events or information about an application provided by the third-party system 160. In some embodiments, the third-party system 160 comprises one or more web servers providing content to the client device 110 via the network 130. The third party system 160 may be separate from the social networking system 140 and the advertising system 150. For example, the third-party system 160 is associated with a first domain while the social networking system 140 is associated with a separate domain. The third-party system 160 may provide content to the client device using web pages that comprise markup language documents that include content as well as indicators for formatting. When users interact with an advertisement at the client device, the advertisement may direct the user to retrieve additional information from the third-party system 160. For example, the third-party system 160 may provide a retail or shopping webpage for the user to purchase a product in an advertisement, or respond to a poll related to the advertisement. The user's activity on the third-party system is reported to the advertising system 150. In various other embodiments, the reporting by third party system 160 may be performed by the client device 110, the social networking system 140 or any combination thereof, such that these various systems may report user interactions or conversion activity to the advertising system 150. For example, users may access content via an application on the client device 110. This application may report activity to the advertising system 150 as the user accesses and interacts with content in the application.

Advertising System

Figure 2:
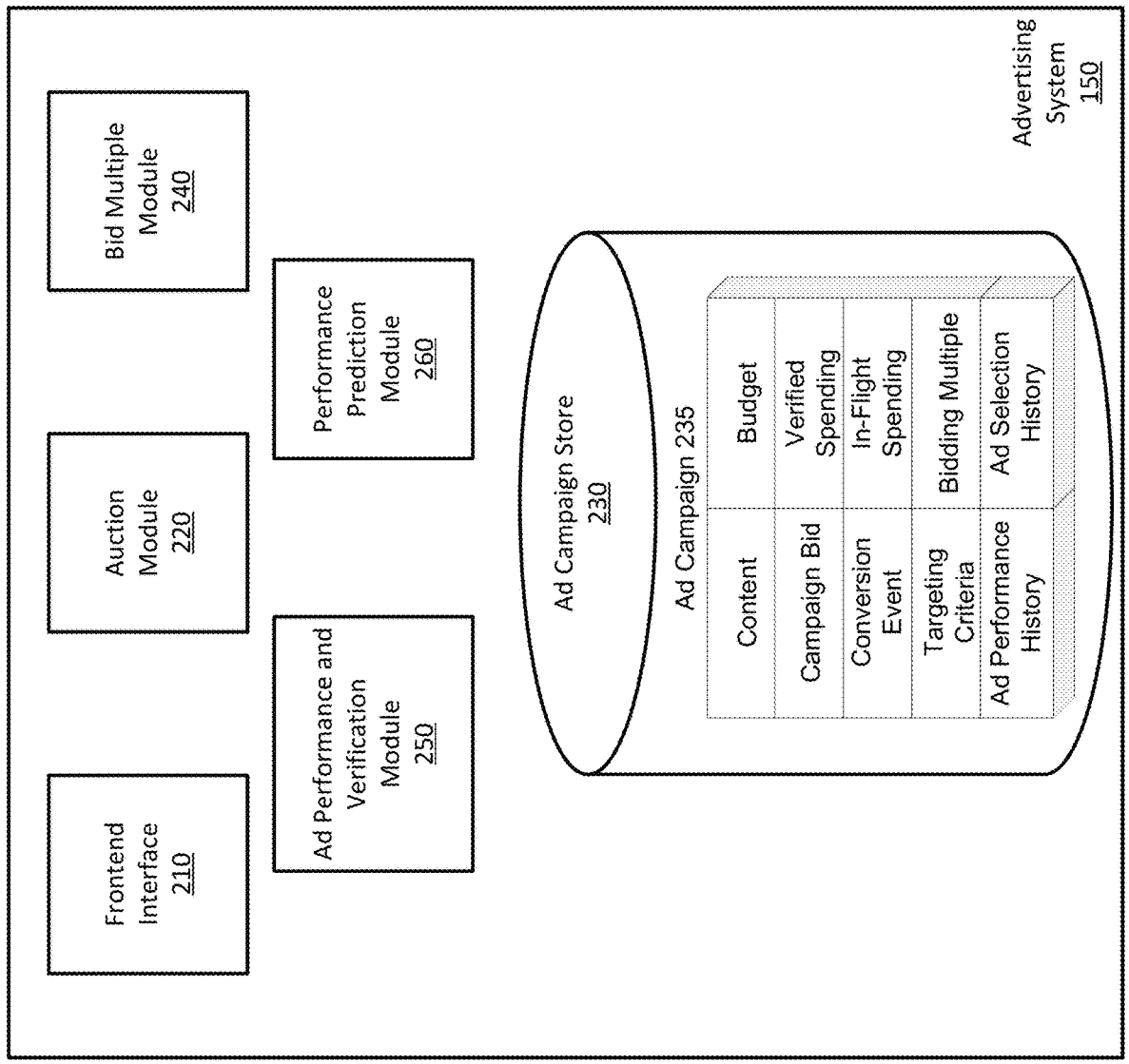
FIG. 2 is a block diagram of an advertising system, in accordance with an embodiment.

FIG. 2 is a block diagram of an advertising system 150, in accordance with an embodiment. The advertising system 150 monitors and predicts ad performance for ads that have been interacted with but have not yet been associated with a conversion ("in-flight"). For these in-flight advertisements, the advertisement has been selected for presentation to a user, but the user has not yet performed a conversion event. The advertising system 150 may also verify that a conversion event has occurred and is payable according to one embodiment. The advertising system 150 includes a frontend interface 210, an auction module 220, an ad campaign store 230, a bid multiple module 240, an ad performance and verification module 250 and a performance prediction module 260. In other embodiments, the advertising system 150 includes more or fewer components than those described herein and the components may perform differing functionality than described herein.

The frontend interface 210 provides an external interface between the systems external to advertising system 150 and the other modules of the advertising system 150. The advertising system 150 receives ads and the associated ad campaign information from advertisers 120 via the frontend interface 210, and stores the ads and ad campaign information in the ad campaign store 230. The advertising system 150 may also receive requests for ads from one or more client devices 110 via the frontend interface 210. The advertising system 150 may also send the selected ads to the client 110. In another embodiment, an advertiser 120 may send a request to the frontend interface 210 to upload information (e.g., images, text or videos associated with an ad) for storage in the ad campaign store 230 in association with one or more ad campaigns. Additionally, the frontend interface 210 may provide an application programming interface (API) functionality to send data directly to an operating system of the client device 110, such as IOS®, ANDROID™, WEBOS® or BlackberryOS.

When a request for an ad is received by the frontend interface 210, in various embodiments, the advertising system 150 may retrieve social networking system information from the social networking system 140 via the frontend interface 210 to identify characteristics of the user. The client device 110 may be associated with a user at the social networking system 140, and the social networking system 140 may return information related to the user to the advertising system 150. In various embodiments when the advertising system 150 is a part of the social networking system 140, the advertising system may directly receive characteristics of the user. In alternate embodiments, the advertising system 150 may receive at least partially anonymized user characteristics of the user to determine which advertisements may target that user. This information may be stored in the ad campaign store 230 associated with one or more ad campaigns. In other embodiments, the interface 210 may respond to an ad request from the social networking system 140 associated with a social networking system 140 user.

As users interact with the advertisement and perform additional actions related to the advertisement, the frontend interface 210 may also receive and store these actions at the ad campaign store 230. For example, when a client device 110 retrieves an advertisement and displays the advertisement to a user, the client device 110 may notify the frontend interface 210 that an impression of the advertisement has occurred. Similarly, the frontend interface 210 may also receive an indication that the user interacted with the advertisement, shared the advertisement on the social networking system 140, or purchased a product at a related third-party system 160. Each of these interactions is stored at the ad campaign store 230 and may constitute a conversion event and may be related to payment by the advertiser for the advertisement.

The ad campaign store 230 stores information describing ad campaigns 235 received from one or more advertisers through interface 210. The ad campaign 235 is shown as stored within the ad campaign store 230, though different types of information relating to the ad campaign 235 may be stored in separate databases. For example, a history of an ad campaign's performance and conversion frequency may be stored separately and individually calculated. An advertising campaign 235 is associated with items of ad content. For example, content may include audiovisual information associated with an ad campaign such as text, image, audio, video, or any other suitable data presented to a user. In various embodiments, the advertisement content is associated with a network address specifying a landing page, or other destination, to which a user is directed when the advertisement is accessed. Furthermore, in some embodiments, the content of the ad content may require user interaction through client device 110.

An ad campaign stored in the ad campaign store 230 may also specify additional information about the one or more constraints or goals. For example an ad campaign may specify a budget, a campaign bid, and verified spending including a maximum bid amount per impression, a remaining budget and conversion events, as well as targeting criteria specifying characteristics of users to be served the ad. To track the spending of the ad campaign, the spending is maintained in two parts: verified spending and in-flight spending. The verified spending represents completed conversion events that have been verified and are payable to the advertising system. The in-flight spending represents estimated spending associated with the ad campaign 235 for advertisements that have been selected for a client device 110, but which have not generated conversion events. As the ad campaign spends its budget, a bidding multiple may be generated for the ad campaign to pace the selection of the ad campaign over the duration of the ad campaign. That is, the bidding multiple may be adjusted by the bid multiple module 240 to increase or decrease an advertiser's bid based on whether the ad campaign 235 is ahead of behind its expected spending for the ad campaign. In addition, the ad campaign 235 may also maintain a record of the ad performance history for the advertisement, indicating prior placements of the advertisement and resulting conversion events. The ad performance history may also maintain a record of any users or associated user characteristics for the previous ad placement. Finally, the ad selection history for the ad campaign identifies in-flight advertisements, such as previous auctions in which the ad campaign was selected for display to the user. This ad selection history includes those situations in which future conversion events may occur, and is used by the performance prediction module 260 to determine the in-flight spending. Though these components are briefly described here, additional or fewer components to an ad campaign may be used.

The auction module 220 receives a request for an advertisement and selects an advertisement to fulfill the request. To select the advertisement, the auction module 220 performs an auction among the advertisements eligible to compete for placing an advertisement to the user. To determine eligible advertisements, the auction module 220 may retrieve characteristics of the user and compare the user characteristics to the targeting criteria or other target audience associated with an ad campaign 235. If the user matches the targeting criteria, the ad may be targeted to the user.

For the eligible ads, the auction module 220 determines a paced bid for each advertisement using the bidding multiple for the advertisement. The bidding multiple is used to adjust the campaign bid for use in the auction. In addition, the auction module 220 may convert the advertiser's bid to a per-selection basis, to account for the different likelihood of users performing each conversion event. Thus, an advertising campaign 235 priced on a "per click" basis accounts for the likelihood that, given the ad is selected, the user will click on the advertisement. This permits the paced bid to compete against other advertisements in the auction module 220. The auction module 220 may determine the likelihood that a user performs the conversion event using the mean or average conversion rate, or may use a computer model to predict an individual user's response based on other user responses.

In some embodiments, no campaign bid is used, and instead the paced bid is adjusted upwards or downwards using the bidding multiple. For example, this may permit an advertiser to decline to set a budget, and instead permit the advertising system to adjust the paced bid upwards or downwards according to estimated spending towards the budget. In other examples, a similar result occurs when the bidding multiple may be greater than 1.0, permitting paced bids higher than the campaign bid when the advertisement.

Based on the value of the paced bids, the auction module 220 selects an ad as the selected ad to be presented to a client 110 by the interface 210. The auction module 220 may simply select the ad associated with the highest modified bid amount, wherein the modified bid amount is a product of a maximum bid amount per impression allowed by the advertiser 120 and an effective bid multiple associated with an ad stored in the ad campaign store 230. In other embodiments, the auction module 220 may alternatively select an ad based on additional criteria, such as the context of the ad, the identity of the entity requesting the ad, or any other suitable criteria. In one embodiment, the auction module may select multiple ads to be presented to a client 110 by the interface 210 wherein each selection may be based on the highest modified bid amount or on an additional criteria as described above. In some examples, the advertisements also compete against other content, such as social networking content, for presentation to the client 110. This automated form of bidding precludes the need for advertisers 120 to manually submit bids for ads, instead allowing an advertiser to merely set an ad's budget, plus other goals and constraints. Once ads and ad information are uploaded through interface 210, bids are then determined without direct or explicit action by advertisers 120. For that ad request, the selected ad is then sent to a user, and may be considered "in flight" with respect to a conversion event.

The bid multiple module 240 generates the bid multiple for an advertisement using the verified spending and in-flight spending, along with the budget and whether the effective (estimated) spending is at the desired level. The bid multiple in one embodiment is a coefficient in the interval [0.0, 1.0] wherein a value of 1.0 represents the maximum the advertiser is willing to pay. In other embodiments, the bid multiple may exceed 1.0, for example if spending for an advertisement is below the expected spend for a current time in the duration of the advertising campaign. In one embodiment, the bid multiple module 240 receives verified spending and in-flight estimated spending from the ad performance and verification module 230 and the performance prediction module 270. The ad performance and verification module 230 may provide the verified spending measuring current performance of an ad associated with an ad campaign stored in the ad campaign store 230 further described below. The bid multiple module 240 may determine a total estimated spending using the verified spending and in-flight spending. The estimated total spend includes the measure of all conversions associated with previously presented ads as well as any ads currently inflight.

Figure 3:
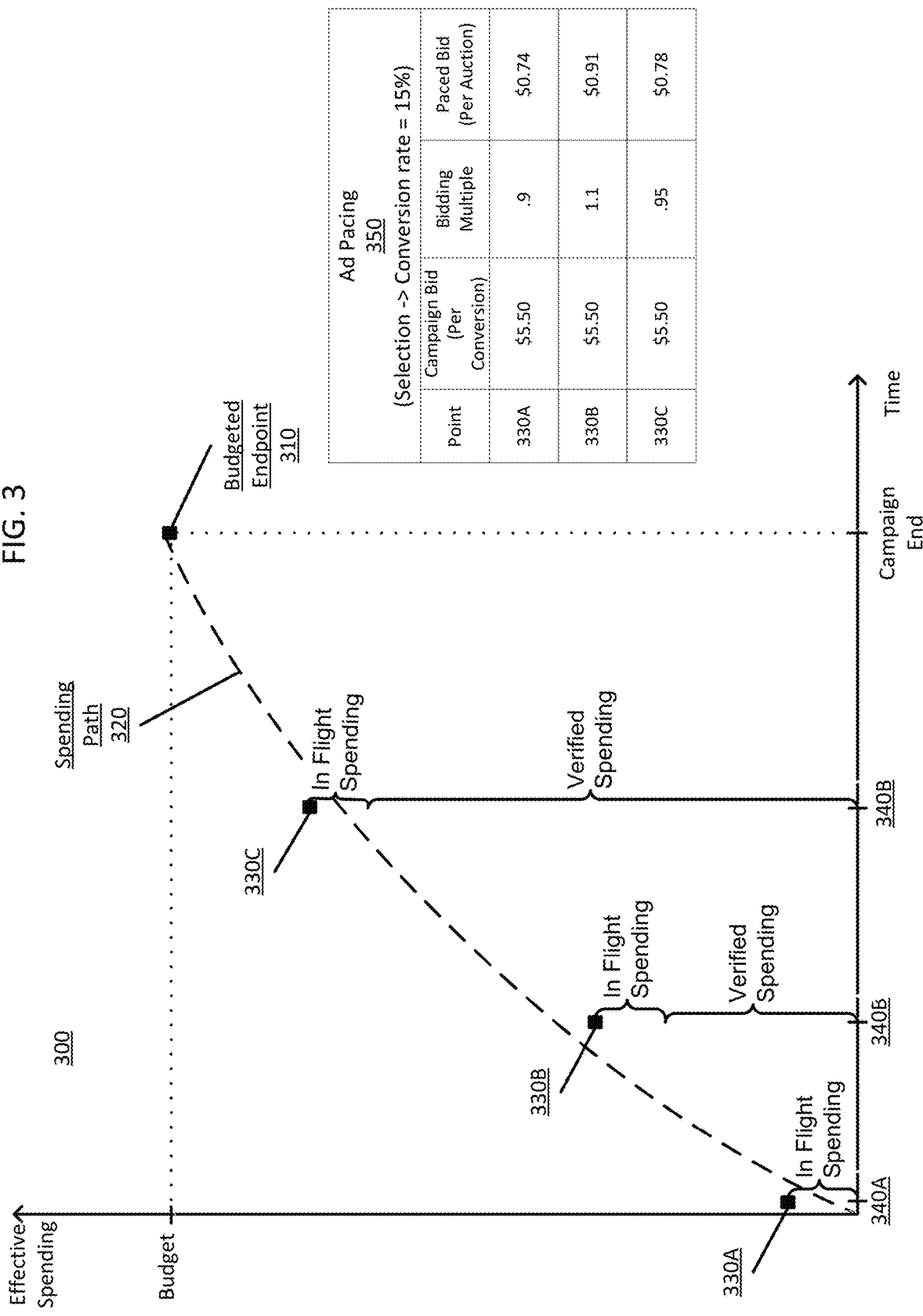
FIG. 3 illustrates in-flight and verified spending with respect to a desired spending path in one example.

FIG. 3 illustrates in-flight and verified spending with respect to a desired spending path 320 in one example. The spending path 320 indicates a desired level of spending to reach the budget at the conclusion of the ad campaign, indicated by budgeted endpoint 310. That is, the budgeted endpoint 310 is at the end of the campaign time and at the total budget level for the ad campaign. In this example, the desired spending path provides an additional amount of spending in the beginning and middle of the ad campaign relative to the end of the ad campaign. When the effective spending rises above the spending path 320, the campaign is expected to over-spend relative to its desired spending path 320, and the bidding multiple may be reduced. When the effective spending is below the spending path 320, the campaign is expected to under-spend relative to its desired spending path 320, and the bid multiple may be increased. Thus, FIG. 3 conceptually illustrates the "pace" at which conversion events should occur for the ad campaign.

In this example, point 340A is near the beginning of the advertising campaign. At this point, the ad has been selected for several ad requests, and has an effective spending level 330A. This effective spending level includes verified spending and In-Flight spending at time 340A. In this example, no conversion events have been received, so the effective spending 330A includes only in-flight spending for selected ads. Because the effective spending accounts for in-flight ads, the bid multiple module 240 can account for the in-flight spending estimate and identify that the effective spending is actually higher than the spending path 320, and reduce the bid multiple. At effective spending level 330B, the effective spending level is below the spending path, and the bid multiplier may be increased. Likewise, at effective spending level 330C, the effective spending level is higher than expected by the spending path 320, and the bid multiplier may be reduced. In example effective spending level 330C, the in-flight spending estimate permits the biding multiple to be decreased, despite that verified spending is below the spending path 320. By adjusting the bid multiple with the verified spending and in-flight spending, the advertisement campaign may have a more consistent pacing of its advertisements.

A sample ad pacing table 350 shows the variation in the paced bid for an auction over the course of the ad campaign. In this example, the campaign bid remains the same, paying $5.50 per conversion and the rate at which users convert after the ad is selected is 15%. In practice, the expected conversion rate may vary by user. Also in this example, the bidding multiple is permitted to exceed 1.0. Accordingly, as the expected spend rises and falls relative to the spending path 320, the paced bid is adjusted to increase or decrease the likelihood that the ad campaign wins the auction.

Returning to FIG. 2, the ad performance and verification module 250 generates the verified spending, while the performance prediction module 260 determines the estimated in-flight spending for an advertisement. The ad performance and verification module 250 receives one or more user generated conversion events such as click, or other conversion events associated with an ad and monitors the performance ("spend") associated with an ad campaign. For example, the ad performance and verification module 250 monitors conversion events which may include an impression, an interaction with an ad, an interaction with an object associated with an advertisement, etc. The ad performance and verification module 250 may also verify the received conversion event. For example, the ad performance and verification module 250 may check for legality of the conversion event received, and verify it is properly creditable to the advertiser. This may include, for example, confirming a purchase was actually made, confirming that the user is the same user that was served the advertisement, and so forth. For certain advertisements, the confirmation of a conversion event may take hours or days, which can further cause the verified spending to lag the expected number of conversion events for ads in-flight, and may increase the total number of in-flight ads. In response to the received conversion events associated with an ad campaign stored in the ad campaign store 230 and selected for presentation to the user by the auction module 220, the ad performance and verification module 250 calculates and outputs the verified spending for the advertisement.

The performance prediction module 260 predicts the in-flight spend for an ad campaign. In some configurations, performance prediction module 260 receives historical data including social context and the current verified spend associated with an ad campaign from the ad performance and verification module 250. In some embodiments, the performance prediction module 260 provides a measure of the total expected spend associated with an ad campaign to the bid multiple module 240.

The performance prediction module 260 may use various factors in predicting whether a user will perform a conversion event. These factors may be used in a computer model to predict a conversion event for each advertisement in-flight. In one embodiment, the performance prediction module 260 identifies the website, application, game, or other setting in which a requested ad will appear through interface 210, and the identified setting affects the prediction of a conversion event. The performance prediction module 260 may also receive information related to the user of a requested ad, such as the user's age, location, education, job, or any other biographic information related to the user. For example, the performance prediction module 260 may receive information from the social networking system 140, via interface 210, that the user associated with an ad lives in a particular location or neighborhood, is of a particular socioeconomic background, or has a particular educational background. Alternatively, the performance prediction module 260 may not always receive such information.

The performance prediction module 260 may predict the likelihood that a user of an impression takes a particular action with regards to the presented ad. In one embodiment, the performance prediction module 260 predicts the likelihood that a user will click on or otherwise select a requested ad. In another embodiment, the performance prediction module 260 predicts the likelihood that a user will share, "like" or otherwise endorse the ad within the context of a social networking system. The performance prediction module 260 may predict the likelihood that a user will watch a requested ad, play a requested ad, answer a question or survey posed in a requested ad, make a purchase in conjunction with the requested ad, or any other action which a user may take with regards to a requested ad.

Based on the predictions of user actions described above, the performance prediction module 260 may determine a conditional probability of receiving a conversion event given any previous user interactions with the advertisement. For example, the performance prediction module 260 may determine the probability of a conversion event given a "click" or the probability of a conversion even given that the user watches or plays a requested ad, answers a question or performs another user interaction. Thus, the performance prediction module 260 predicts the likelihood that a user will perform a conversion event for the ad based on the amount of time since the ad was selected, actions performed by the user, and context about the user's device, such as what device the user is operating, the time of day, and so forth. In this way, the likelihood of conversion may account for the user's particular circumstances and interactions between the time the ad was selected and the time that the performance prediction module 260 estimates the in-flight spend.

In other embodiments, the ad performance prediction module 260 may also receive the measure of current spend associated with an ad campaign from the ad performance and verification module 250. The ad performance prediction module 260 may also receive historical trends of conversion events across various user demographics, network types and times of day and impression cost fluctuations. In still other embodiments, the performance prediction module 260 may combine conditional probabilities described above with historical trends to create regressions or computer models that determine the likelihood of receiving a conversion given a time elapsed since a specific user interaction associated with an ad that is currently inflight. The performance prediction module 260 is further described below in conjunction with FIG. 5.

Pacing Ad Campaign Spend

Figure 4A:
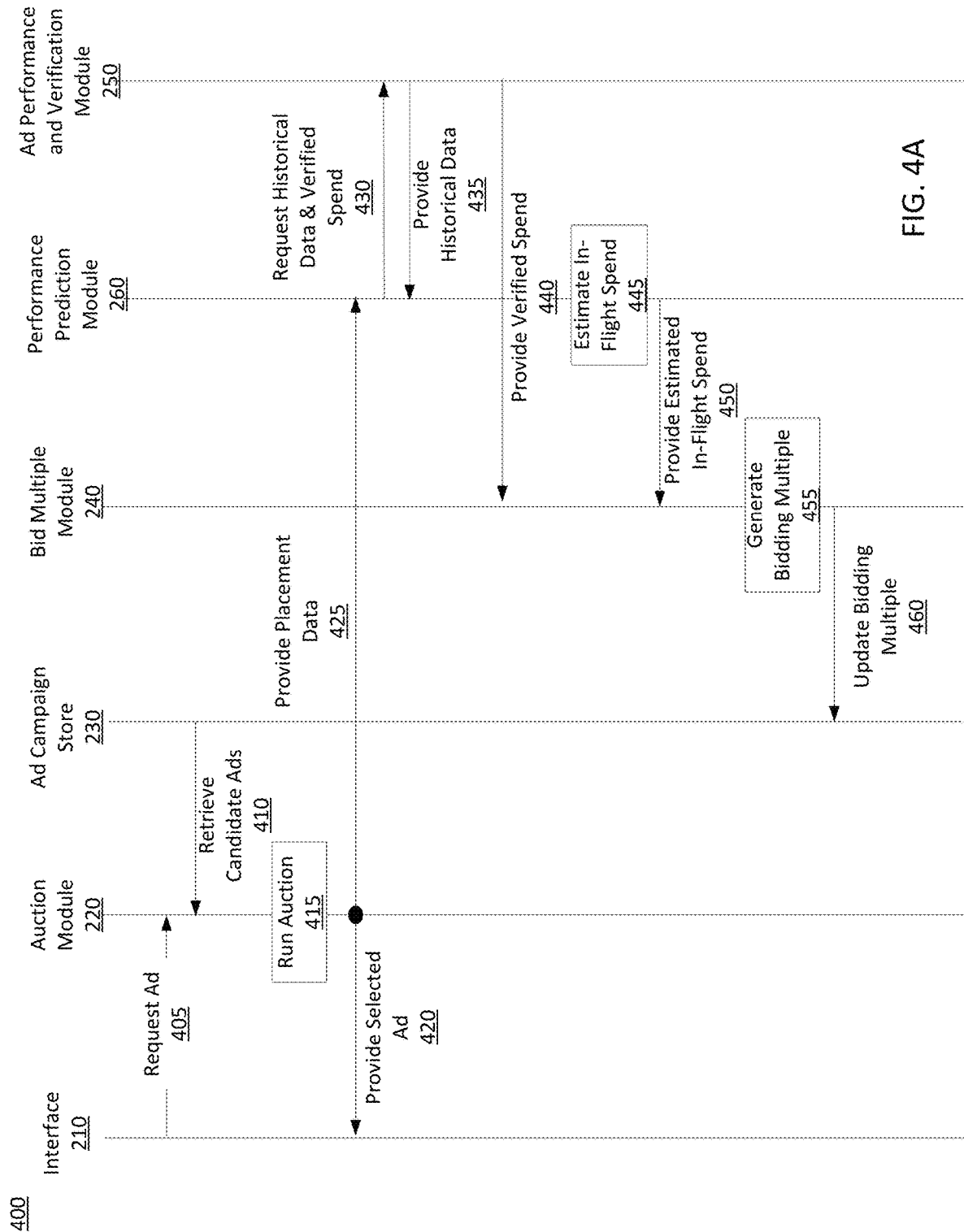
FIG. 4A-4B illustrate an interaction diagram of a method for determining a bidding multiple based on a probability of conversion and modifying a bidding multiple based on a received conversion event.
Figure 4B:
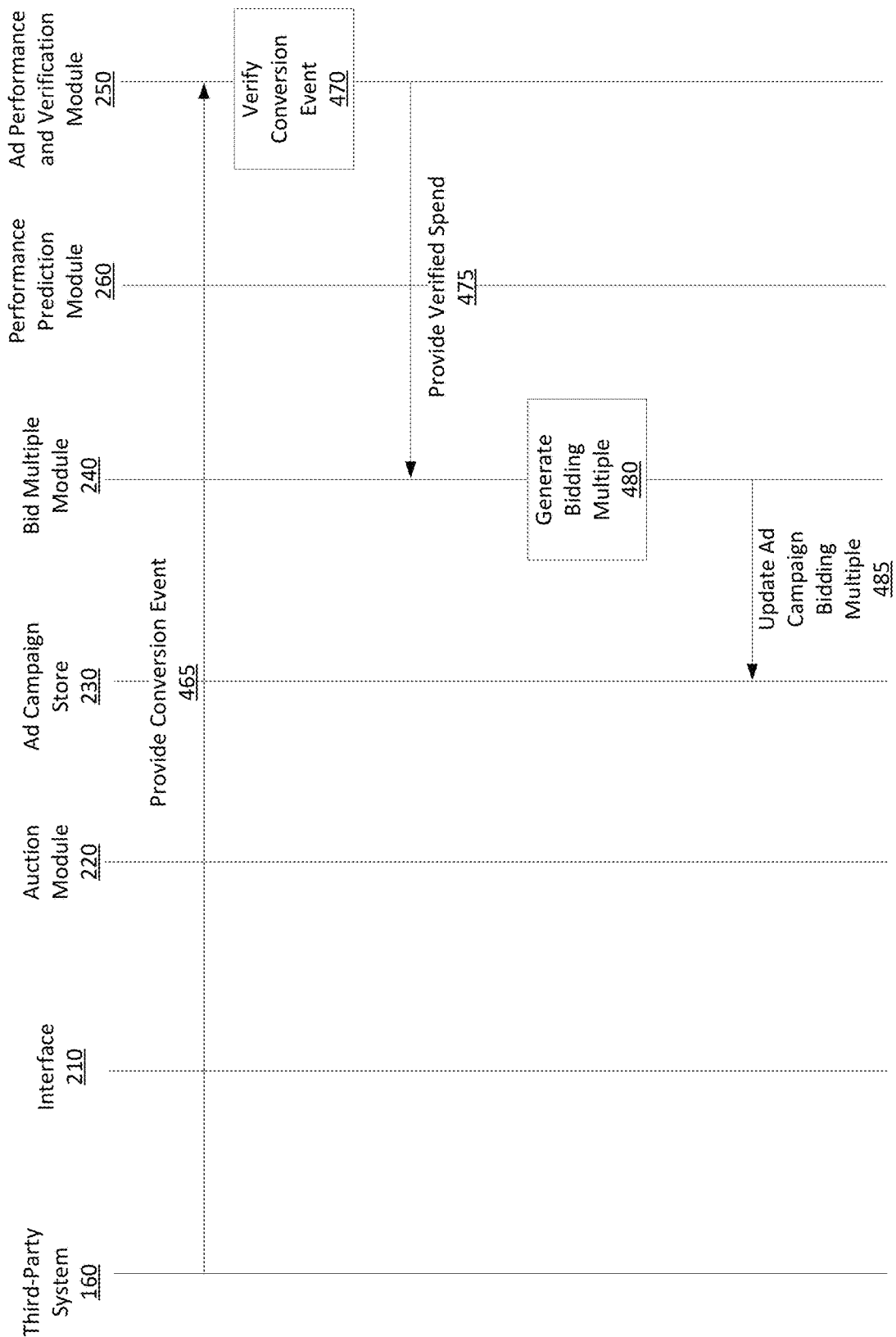

FIG. 4A-4B illustrate an interaction diagram of a method for determining a bidding multiple based on a probability of conversion and modifying a bidding multiple based on in-flight advertisements. FIG. 4A illustrates an interaction diagram for an ad associated with ad campaign 310 currently inflight. As depicted in FIG. 4A, initially a client device 110 requests 405 an ad from the advertising system 150 through interface 210 as described above.

In response to the request 405 for an ad, the interface 210 provides the request to the auction module 220. The auction module 220 retrieves candidate advertisements from the ad campaign store 230. The retrieved 410 candidate advertisements include the maximum bid amount per impression and the bidding multiple associated with each of the candidate advertisements. As described above in conjunction with FIG. 2, the bidding multiple and the maximum bid amount per impression associated with an ad campaign are used to determine a paced bid for each candidate ad in the auction. The bidding multiple may also be converted to a paced bid reflecting the likelihood of a conversion based on ad selection.

Based on the determined paced bids per candidate ad, the auction module 220 runs an auction 415 to select an ad associated with an ad campaign 310 to be provided 420 to interface 210 for presentation on the client device 110. The placement data of the selected advertisement is provided 425 to the performance prediction module 260. Thus, the ad may both be placed to the client device, and a notification of its placement sent for in-flight spending prediction. As described above in conjunction with FIG. 2, the performance prediction module requests 430 historical data including social context of previous placements of the advertisement as well as a measure of the current spend from the ad performance and verification module 250.

The ad performance and verification module 250 responds to the request 430 by providing 435 historical data and may also include the current verified spending 440 to the performance prediction module 260. For example, the performance prediction module 260 requests 430 historical data to determine the likelihood of a conversion given a user generated "click" associated with the selected 415 ad campaign. This likelihood of a conversion may be modeled based on user characteristics or a demographic of the user, and the amount of time that has passed since the selected ad was provided 420 to the client device. In some embodiments, the historical data may also include the number of "likes" associated with an ad, the number of times an ad associated with ad campaign 310 has been shared or other social context stored in the ad campaign store 230. In still other embodiments, historical data associated with an ad campaign may also include local network quality data, bandwidth available and country associated with the client 210. In one or more embodiments, the ad performance and verification module responds to the request 430 by providing 435 historical data associated with the received 425 ad placement data. In some embodiments, the provided 435 historical data may also include time stamps of previously recorded conversion events in relation to when the user interaction (e.g., a "click") was originally recorded. By modeling these characteristics in the historical data, the performance prediction module 260 may effectively predict whether a user is likely to convert. Information about the user may be determined when the ad is provided 420 to the user, or the advertising system 150 may query the client device 110 to determine the current status of the client device 110.

Additionally, the ad performance and verification module 250 may provide 440 the current verified spend to the performance prediction module 260 and the bid multiple module 240. The verified spend associated with ad campaign includes the verified spend related to the number of previously recorded and verified conversion events associated with the ad campaign 310. In one or more embodiments, historical trends may be combined with a measure of the current spend to generate an in-flight spend estimate 445 of the total current spend including the ads that are currently inflight.

The estimate of the total spend 445 including the total processed current spend is provided 450 to the bid multiple module 240. The estimated total current spend 445 is combined with a measure of the current spend to generate 455 a bidding multiple that in one embodiment is between [0, 1]. In various embodiments, the bid multiple module 240 updates 460 the ad campaign store 230 with the generated 455 bidding multiple for use in subsequent auctions. Over time, the estimated in-flight spend for a given advertisement may decrease as the time from the ad impression increases. However, the estimated in-flight spend may increase if a user performs an action related to the advertisement but that does not result in a conversion event.

FIG. 4B illustrates an interaction diagram for an ad associated with an ad campaign 310 at some later time when the conversion event is received and the ad associated with ad campaign 310 is no longer inflight. As illustrated in FIG. 4B, the ad performance and verification module 250 receives 465 a conversion event associated with ad campaign 310 from third-party system 160. The Ad performance and verification module 250 verifies 470 the authenticity of the conversion event and provides 475 the actual spend to bid multiple module 240. In some embodiments, the conversion event may be received through interface 210 as described above in conjunction with FIG. 2.

The bidding module 240 generates a bidding multiple 480 using the provided 475 actual spend and updates 485 the bidding multiple associated with the associated ad campaign in the ad campaign store 230.

Figure 5:
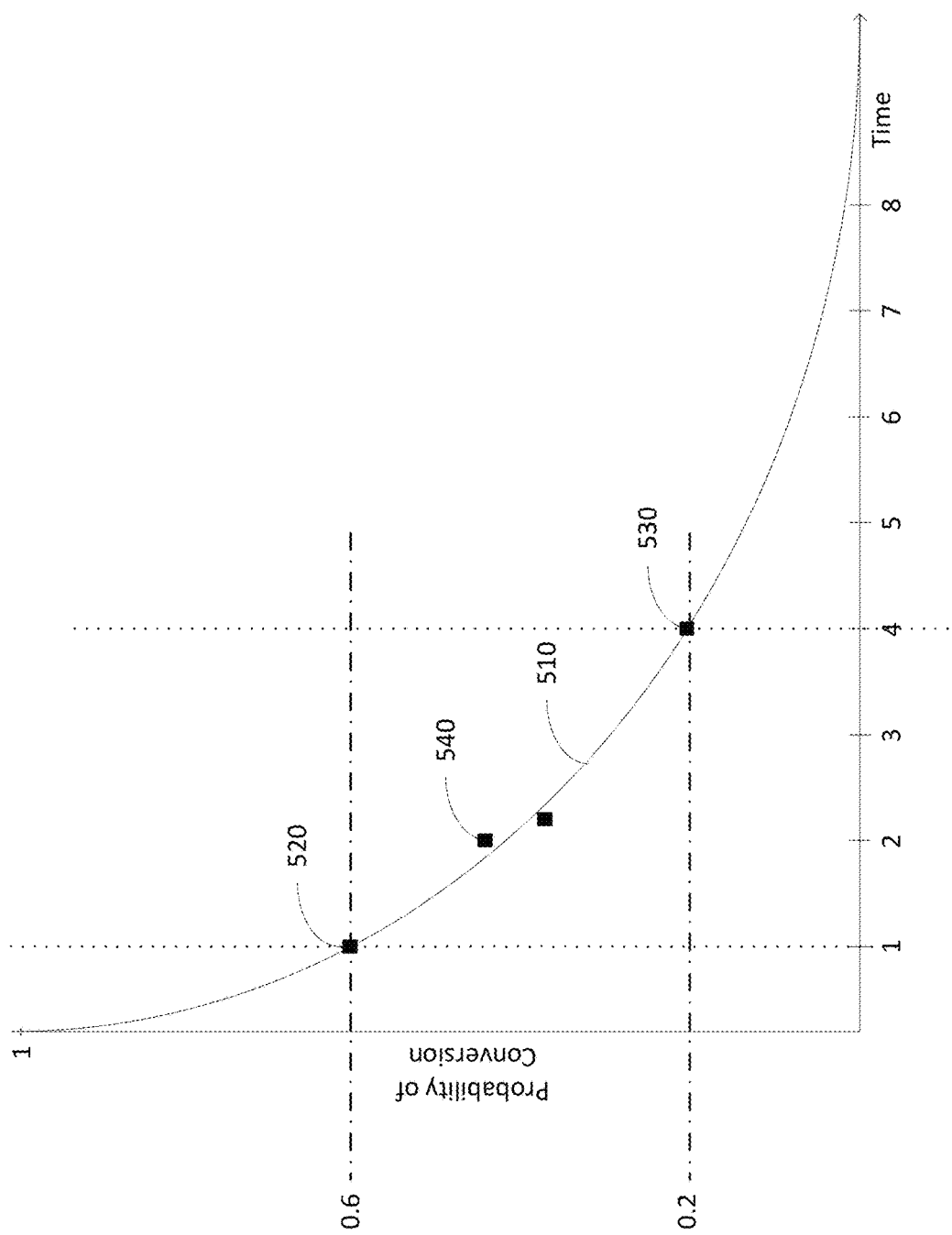
FIG. 5 is a graph illustrating an example trend of conditional probabilities of a conversion event occurring given a particular user interaction over time.

FIG. 5 is a graph illustrating an example trend of conditional probabilities of a conversion event occurring given a particular user interaction graphed over time as modeled by the performance prediction module 260. The graph in FIG. 5 also shows a conditional probability of a conversion event 510 at 1 hour 520 and 6 hours 530 after the recorded user interaction. User interaction types may be "click" or other interaction types further discussed above in conjunction with FIG. 2.

In the example of FIG. 5, the conditional probability of a conversion event follows a decaying exponential trend over time. As illustrated in FIG. 5 the conditional probability curve 510 at a time directly after the recorded interaction (0 hours) has a value of 1. However, at a time of 1 hour after the user interaction, the conditional probability of conversion 520 is 0.6. Similarly, at a time 6 hours after the interaction the probability of a conversion event 520 has dropped to 0.2. In this example, the conditional probability may reduce the originally-predicted expected value of a conversion event. For example, immediately after selection of the advertisement, the expected likelihood of a conversion event may be the same as when the content item was selected in the advertisement. However, as additional time passes without a conversion event, the expected likelihood of a conversion event may decrease.

FIG. 5 also includes sample data 540 obtained from the ad performance and verification module 250 indicating the elapsed time between the received conversion event and the originally recorded user interaction plotted against elapsed time. In other embodiments, the conditional probability may follow a trend representing such as a line, a quadratic or another function describing the likelihood that a user converts based on the user's actions and elapsed time since the advertisement was selected.

In various embodiments the decay curve representing the conditional probability of conversion may be calculated by performing a linear regression over previously captured data by minimizing the mean square error between a decay curve and two or more data points 540. For example, sample data points 540 from the ad performance and verification module 250 indicating the elapsed time between a recorded user interaction and a verified conversion event are linearly fitted to an exponential decay curve to generate a conditional probability curve 510. In other embodiments, the decay curve 510 may be based on various geographic or demographic factors. For example, the decay curve may be generated based on attributes such as country, client device type, time of day, available bandwidth, the quality of the user's network connection or any combination thereof. In still other embodiments, demographic and geographic contexts may be combined with social context such as the number of "likes" or "shares" an ad associated with an ad campaign has received. In some embodiments, a computer model is generated to determine the likelihood of conversion for a user. The computer model may be trained based on previous presentations of the ad to users, characteristics of those users, and historical data.

In one or more embodiments, the performance prediction module 260 also maintains statistics on the observed trends. In some embodiments, the decay curve may be generated or updated real-time or periodically. In other embodiments, the decay curve may be updated based on observed changes in observed statistics.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these components of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following

What is claimed is:

1. A method comprising:
    receiving an advertising campaign from an advertiser, the advertising campaign designating a candidate advertisement, an advertising budget, and one or more conversion events, each conversion event designating desired actions that cause payment by the advertiser for the candidate advertisement;

receiving an advertising request for an advertisement from a user of an online system;

identifying one or more in-flight candidate advertisements of the advertising campaign previously sent to other users of the online system for which no conversion event of the one or more conversion events has occurred and for which an interaction with the one or more candidate advertisements has occurred;

estimating a value of in-flight spend of the advertising campaign by predicting a likelihood that each of the in-flight candidate advertisements will result in a conversion event of the one or more conversion events, wherein the value is predicted based on a time elapsed since the interaction, and wherein predicting the likelihood comprises:
generating, in real-time or updating periodically, a decay curve for the advertising campaign by performing a linear regression on recorded historical data associated with the advertising campaign; and
determining a conditional probability of receiving a conversion event associated with the in-flight candidate advertisement from the advertisement campaign, wherein the conditional probability is determined by the decay curve;

determining a paced bid amount based on the advertising budget, a verified spend, and the estimated in-flight spend of the advertising campaign, wherein the verified spend accounts for payments made by the advertiser for completed conversion events; and adding the candidate advertisement to an auction of advertisements for the advertising request, wherein the auction determines a selected advertisement presented to the user based on the determined paced bid amount.

2. The method of claim 1, wherein determining the paced bid amount comprises determining a bidding multiplier and multiplying a campaign bid provided by the advertiser by the bidding multiplier.

3. The method of claim 2, wherein the bidding multiplier is inclusively within the range [0.0-1.0].

4. The method of claim 1, wherein determining the paced bid amount comprises determining a total spend for the candidate advertisement using the estimated in-flight spend and the verified spend, and comparing the total spend to a spending path for the advertising campaign, wherein the paced bid is increased when the total spend is below the spending path and the paced bid is decreased when the total spend is above the spending path.

5. The method of claim 1, wherein the in-flight candidate advertisement is associated with at least one action of a user responsive to the candidate advertisement, and the conditional probability determines the conditional probability of the conversion event given the action.

6. The method of claim 1, wherein the predicted likelihood that an in-flight candidate advertisement will result in a conversion is based on network bandwidth or network quality associated with a client device of the user on which the in-flight candidate advertisement was presented.

7. A system comprising:
a processor; and
a computer-readable storage medium having instructions encoded thereon that when executed by the processor cause the processor to perform steps of:
receiving an advertising campaign from an advertiser, the advertising campaign designating a candidate advertisement, an advertising budget, and one or more conversion events, each conversion event designating desired actions that cause payment by the advertiser for the candidate advertisement;

receiving an advertising request for an advertisement from a user of an online system;

identifying one or more in-flight candidate advertisements of the advertising campaign previously sent to other users of the online system for which no conversion event of the one or more conversion events has occurred and for which an interaction with the one or more candidate advertisements has occurred;

estimating a value of in-flight spend of the advertising campaign by predicting a likelihood that each of the in-flight candidate advertisements will result in a conversion event of the one or more conversion events, wherein the value is predicted based on a time elapsed since the interaction, and wherein predicting the likelihood comprises:
generating, in real-time or updating periodically, a decay curve for the advertising campaign by performing a linear regression on recorded historical data associated with the advertising campaign; and
determining a conditional probability of receiving a conversion event associated with the in-flight candidate advertisement from the advertisement campaign, wherein the conditional probability is determined by the decay curve;

determining a paced bid amount based on the advertising budget, a verified spend, and the estimated in-flight spend of the advertising campaign, wherein the verified spend accounts for payments made by the advertiser for completed conversion events; and adding the candidate advertisement to an auction of advertisements for the advertising request, wherein the auction determines a selected advertisement presented to the user based on the determined paced bid amount.

8. The system of claim 7, wherein determining the paced bid amount comprises determining a bidding multiplier and multiplying a campaign bid provided by the advertiser by the bidding multiplier.

9. The system of claim 8, wherein the bidding multiplier is inclusively within the range [0.0-1.0].

10. The system of claim 7, wherein determining the paced bid amount comprises determining a total spend for the candidate advertisement using the estimated in-flight spend and the verified spend, and comparing the total spend to a spending path for the advertising campaign, wherein the paced bid is increased when the total spend is below the spending path and the paced bid is decreased when the total spend is above the spending path.

11. The system of claim 7, wherein the in-flight candidate advertisement is associated with at least one action of a user responsive to the candidate advertisement, and the conditional probability determines the conditional probability of the conversion event given the action.

12. The system of claim 7, wherein the predicted likelihood that an in-flight candidate advertisement will result in a conversion is based on network bandwidth or network quality associated with a client device of the user on which the in-flight candidate advertisement was presented.

13. A computer program product comprising a non-transitory computer-readable storage medium having instructions encoded thereon that when executed by a processor cause the processor to perform steps of:
receiving an advertising campaign from an advertiser, the advertising campaign designating a candidate advertisement, an advertising budget, and one or more conversion events, each conversion event designating desired actions that cause payment by the advertiser for the candidate advertisement;

receiving an advertising request for an advertisement from a user of an online system;

identifying one or more in-flight candidate advertisements of the advertising campaign previously sent to other users of the online system for which no conversion event of the one or more conversion events has occurred and for which an interaction with the one or more candidate advertisements has occurred;

estimating a value of in-flight spend of the advertising campaign by predicting a likelihood that each of the in-flight candidate advertisements will result in a conversion event of the one or more conversion events, wherein the value is predicted based on a time elapsed since the interaction, and wherein predicting the likelihood comprises:
- generating, in real-time or updating periodically, a decay curve for the advertising campaign by performing a linear regression on recorded historical data associated with the advertising campaign; and
- determining a conditional probability of receiving a conversion event associated with the in-flight candidate advertisement from the advertisement campaign, wherein the conditional probability is determined by the decay curve;

determining a paced bid amount based on the advertising budget, a verified spend, and the estimated in-flight spend of the advertising campaign, wherein the verified spend accounts for payments made by the advertiser for completed conversion events; and adding the candidate advertisement to an auction of advertisements for the advertising request, wherein the auction determines a selected advertisement presented to the user based on the determined paced bid amount.

14. The computer program product of claim 13, wherein determining the paced bid amount comprises determining a bidding multiplier and multiplying a campaign bid provided by the advertiser by the bidding multiplier.

15. The computer program product of claim 14, wherein the bidding multiplier is inclusively within the range [0.0-1.0].

16. The computer program product of claim 13, wherein determining the paced bid amount comprises determining a total spend for the candidate advertisement using the estimated in-flight spend and the verified spend, and comparing the total spend to a spending path for the advertising campaign, wherein the paced bid is increased when the total spend is below the spending path and the paced bid is decreased when the total spend is above the spending path.

17. The computer program product of claim 13, wherein the in-flight candidate advertisement is associated with at least one action of a user responsive to the candidate advertisement, and the conditional probability determines the conditional probability of the conversion event given the action.

\* \* \* \* \*